(12) United States Patent
Mishra et al.

(10) Patent No.: US 12,063,141 B2
(45) Date of Patent: Aug. 13, 2024

(54) DISCARDED ALARM COLLECTION METHOD AND SYSTEM FOR IMPLEMENTING

(71) Applicant: Rakuten Symphony Singapore Pte. Ltd., Singapore (SG)

(72) Inventors: Abhishek Kumar Mishra, Madhya Pradesh (IN); Nimit Agrawal, Madhya Pradesh (IN)

(73) Assignee: RAKUTEN SYMPHONY SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/758,512

(22) PCT Filed: May 20, 2022

(86) PCT No.: PCT/US2022/030208
§ 371 (c)(1),
(2) Date: Jul. 8, 2022

(87) PCT Pub. No.: WO2023/224633
PCT Pub. Date: Nov. 23, 2023

(65) Prior Publication Data
US 2024/0195674 A1 Jun. 13, 2024

(51) Int. Cl.
*H04L 41/0604* (2022.01)
*H04L 41/0654* (2022.01)
*H04L 43/06* (2022.01)

(52) U.S. Cl.
CPC ...... *H04L 41/0604* (2013.01); *H04L 41/0654* (2013.01); *H04L 43/06* (2013.01)

(58) Field of Classification Search
None
See application file for complete search history.

(56) References Cited

U.S. PATENT DOCUMENTS

| | | | |
|---|---|---|---|
| 2018/0060153 A1* | 3/2018 | Innes | H04L 41/06 |
| 2018/0351633 A1* | 12/2018 | Birkmeir | H04W 56/008 |
| 2019/0347921 A1* | 11/2019 | Lundy | G08B 21/02 |

OTHER PUBLICATIONS

Khanafer et al., "Automated Diagnosis for UMTS Networks Using Bayesian Network Approach", Jul. 1, 2008, IEEE, IEEE Transactions on Vehicular Technology (vol. 57, Issue: 4, pp. 2451-2461) (Year: 2008).*

* cited by examiner

*Primary Examiner* — Davoud A Zand
(74) *Attorney, Agent, or Firm* — HAUPTMAN HAM, LLP

(57) ABSTRACT

A system for collecting discarded alarm includes a non-transitory computer readable medium configured to store instructions thereon. The system further includes a processor connected to the non-transitory computer readable medium. The processor is configured to execute the instructions for receiving alarm data from a device within a telecommunication network. The processor is further configured to execute the instructions for determining whether the alarm data is missing identifying information. The processor is further configured to execute the instructions for subjecting the alarm data to suppression in response to a determination that the alarm data is missing at least one piece of identifying information. The processor is further configured to execute the instructions for generating instructions for addressing an alarm in response to a determination that the alarm data includes all identifying information.

20 Claims, 6 Drawing Sheets

Discarded Alarm Information

```
 1  {
 2    "gNB_Cell":"null",
 3    "timestamp":"2022-02-24T15:10:58.228Z",
 4    "Kafka offset":"0o898989",
 5    "gNB ID":"eop923",
 6    "notification":{
 7      "body":{
 8        "cnfcID":"",          ─── 210
 9        "cnfID":"",
10        "aniUnitOutOfOrderCause":"",
11        "cnfcName":"",
12        "aniDeviceId":"0oei83",
13        "aniDeviceSerialNo":"q2ee",
14        "3gppNotation":"",
15        "aniOranFault":"0o97",
16        "tenantName":"",
17        "nsName":"",
```

FIG. 2

DISCARDED ALARM COLLECTION METHOD AND SYSTEM FOR IMPLEMENTING

RELATED APPLICATIONS

The present application is a National Phase of International Application No. PCT/US2022/030208, filed May 20, 2022.

FIELD

This application relates to a discarded alarm collection method and a system for implementing the method.

BACKGROUND

During operation or testing of a telecommunication network, alarms are generated by components that are not functioning or not functioning properly. In some instances, these generated alarms do not include sufficient data to permit the alarm to be processed. For example, in some instances, the alarm is missing an error code or a time of the event that produced the alarm. In some instances, the alarm is generated for a component that is not listed in an inventory associated with the telecommunication network. In such situations, the alarm is discarded in many systems and the error associated with the alarm is not addressed.

SUMMARY

An aspect of this description relates to a system for collecting discarded alarm. The system includes a non-transitory computer readable medium configured to store instructions thereon. The system further includes a processor connected to the non-transitory computer readable medium. The processor is configured to execute the instructions for receiving alarm data from a device within a telecommunication network. The processor is further configured to execute the instructions for determining whether the alarm data is missing identifying information. The processor is further configured to execute the instructions for subjecting the alarm data to suppression in response to a determination that the alarm data is missing at least one piece of identifying information. The processor is further configured to execute the instructions for generating instructions for addressing an alarm in response to a determination that the alarm data includes all identifying information. In some embodiments, the processor is further configured to execute the instructions for determining whether the alarm data is missing identifying information based on whether the alarm data is missing at least one of an error code, device information or an event time. In some embodiments, the processor is further configured to execute the instructions for generating a report including the suppressed alarm data. In some embodiments, the processor is further configured to execute the instructions for generating the report including at least one of a tabular representation or a graphical representation. In some embodiments, the processor is further configured to execute the instructions for suppressing the alarm data based on a comparison with previously discarded alarm data. In some embodiments, the processor is further configured to execute the instructions for suppressing the alarm data by reducing the alarm data and the previously discarded alarm data into a single discarded alarm in response to available identifying information in the alarm data matching available identifying information in the previously discarded alarm data. In some embodiments, the processor is further configured to execute the instructions for suppressing the alarm data by creating a first entry for the alarm data and a second entry for the previously discarded alarm data in response to available identifying information in the alarm data failing to match available identifying information in the previously discarded alarm data. In some embodiments, the processor is further configured to execute the instructions for determining a root cause analysis (RCA) for the alarm data in response to determining that the alarm data is missing the at least one piece of identifying information. In some embodiments, the processor is further configured to execute the instructions for determining whether the identifying information in the alarm data fails to match at least one of an alarm library or an inventory database; and subjecting the alarm data to the suppression in response to a determination that the identifying information fails to match at least one of the alarm library or the inventory database.

An aspect of this description relates to a method of collecting discarded alarm. The method includes receiving alarm data from a device within a telecommunication network. The method further includes determining whether the alarm data is missing identifying information. The method further includes subjecting the alarm data to suppression in response to a determination that the alarm data is missing at least one piece of identifying information. The method further includes generating instructions for addressing an alarm in response to a determination that the alarm data includes all identifying information. In some embodiments, determining whether the alarm data is missing identifying information includes determining whether the alarm data is missing the identifying information based on whether the alarm data is missing at least one of an error code, device information or an event time. In some embodiments, the method further includes generating a report including the suppressed alarm data. In some embodiments, generating the report includes generating the report comprising at least one of a tabular representation or a graphical representation. In some embodiments, suppressing the alarm data includes suppressing the alarm data based on a comparison with previously discarded alarm data. In some embodiments, suppressing the alarm data includes reducing the alarm data and the previously discarded alarm data into a single discarded alarm in response to available identifying information in the alarm data matching available identifying information in the previously discarded alarm data. In some embodiments, suppressing the alarm data includes creating a first entry for the alarm data and a second entry for the previously discarded alarm data in response to available identifying information in the alarm data failing to match available identifying information in the previously discarded alarm data. In some embodiments, the method further includes determining a root cause analysis (RCA) for the alarm data in response to determining that the alarm data is missing the at least one piece of identifying information. In some embodiments, the method further includes determining whether the identifying information in the alarm data fails to match at least one of an alarm library or an inventory database; and subjecting the alarm data to the suppression in response to a determination that the identifying information fails to match at least one of the alarm library or the inventory database.

An aspect of this description relates to a non-transitory computer readable medium configured to store instructions thereon. The instructions are configured to cause a processor executing the instructions to receive alarm data from a device within a telecommunication network. The instructions are configured to cause a processor executing the instructions to determine whether the alarm data is missing identifying information. The instructions are configured to cause a processor executing the instructions to subject the alarm data to suppression in response to a determination that the alarm data is missing at least one piece of identifying information. The instructions are configured to cause a processor executing the instructions to generate instructions for addressing an alarm in response to a determination that the alarm data includes all identifying information. In some embodiments, the instructions are further configured to cause the processor executing the instructions to determine whether the identifying information in the alarm data fails to match at least one of an alarm library or an inventory database; and subject the alarm data to the suppression in response to a determination that the identifying information fails to match at least one of the alarm library or the inventory database.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram of discarded alarm information in accordance with some embodiments.

DETAILED DESCRIPTION

Figure 1:
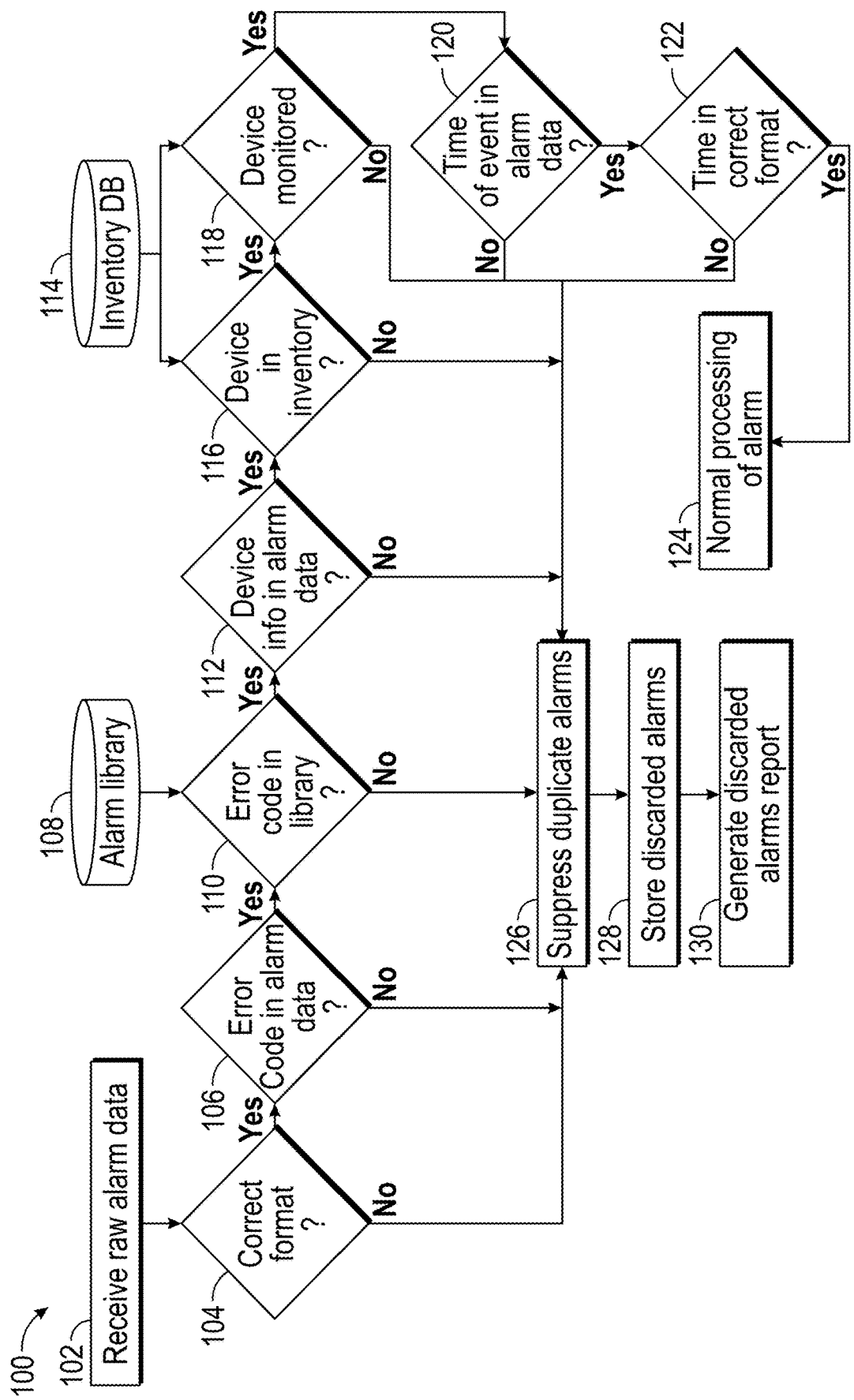
FIG. 1 is a flowchart of a method of collecting discarded alarms in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

During implementation or testing of a telecommunications network, components of the network will experience an error from ceasing of functioning or functioning improperly in some situations. When the components experience an error, an alarm is generated to notify a network monitor of the error. The alarm includes information related to the error, such as a type of error, the component experiencing the error, and a time at which the error occurred. In some instances, the alarm is received by the network monitor in a state where less than all identifying information for the alarm is included in the received alarm data. In other approaches, an alarm that lacks sufficient identifying information is discarded meaning that the error is not addressed. In some situations, the error will eventually be corrected; however, in some instances the error will continue to impact the performance of the network for a prolonged period of time. The inability to utilize alarms that include insufficient amounts of identification information to improve network performance reduces an effectiveness of the network monitoring system and increases a risk for customer dissatisfaction with the network. In some instances, the lack of identification information is a result of latency in the network or a failure within the component that prevents properly alarm generation.

In contrast, the current application describes a method and system for collecting the discarded alarms to determine whether to fix the errors causing the alarms. In some embodiments, received alarm data is analyzed to determine whether any identification information is missing from the alarm data. If no identification information is missing, then the alarm is processed and the error is addressed. If some identification information is missing, then the alarm undergoes a suppressing process to reduce or remove duplicate discarded alarms. The suppressed alarm data is then stored and a report is generated for the discarded alarms. Utilizing the generated report, the network monitor is able to determine whether to attempt to address the error causing the alarm. In some embodiments, addressing the alarm includes providing instructions to a maintenance crew for testing, repairing, or replacing a component of the telecommunication network. In some embodiments, the generated reports are usable to determine whether other maintenance work within the network resolved the discarded alarm. In some embodiments, the generated reports are usable to determine an overall health of the network. Based on the overall health of the network, a vendor is able to make informed decisions regarding maintenance or expansion of the network. The vendor is also able to use the generated report to determine whether customers are likely to be satisfied with performance of the network.

Figure 6:
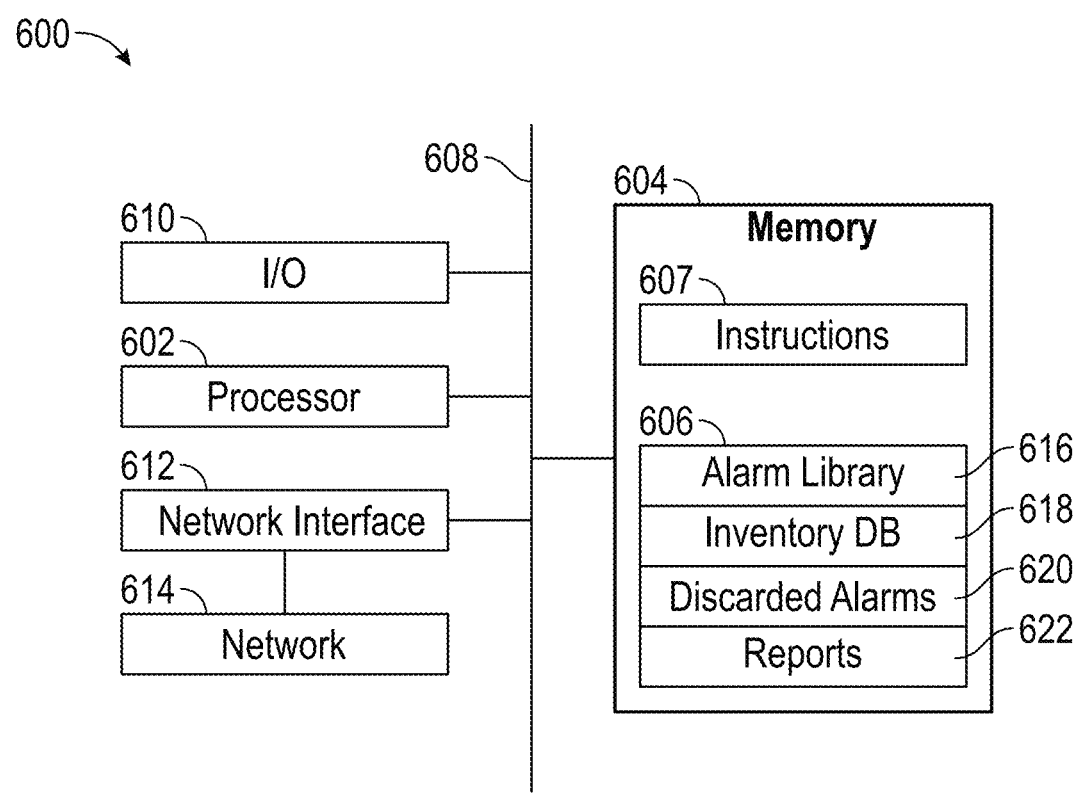
FIG. 6 is a schematic diagram of a system for collecting discarded alarms in accordance with some embodiments.

FIG. 1 is a flowchart of a method 100 of collecting discarded alarms in accordance with some embodiments. In some embodiments, the method 100 is implemented using a system 600 (FIG. 6). In some embodiments, the method 100 is implemented using a different system from system 600 (FIG. 6). The method 100 is usable to collect discarded alarms and to suppress display of information related to discarded alarms. In some embodiments, a discarded alarm is an alarm that is received that lacks sufficient identifying information to permit pinpointing the error within the telecommunication network. By automating the collection and suppression process for the discarded alarms, an amount of time for the network monitor to review alarm logs is reduced. In addition, the suppression of the discarded alarms helps to reduce storage space for storing the alarm log. The collection and suppression of discarded alarms will also help to avoid a situation where a network monitor becomes overwhelmed by a number of alarms received within a given time. Reducing a risk of the network monitor becoming overwhelmed helps to reduce a risk that the network monitor will fail to timely address a generated alarm.

The method 100 also includes generating of discarded alarm reports. These discarded alarm reports help the network monitor determine whether an error causing the discarded alarm is able to be identified and addressed. In some embodiments, addressing a discarded alarm includes sending instructions to a maintenance crew for repairing or replacing a component within the network. In some embodiments, addressing the discarded alarm includes updating software of the component or rebooting the component, e.g., remotely from the network monitoring system. The discarded alarm reports also facilitate determination of overall health of the network; and determining whether addressing of other alarms within the network also resolved any discarded alarms.

In operation 102, the raw alarm data is received by a network monitoring system. In some embodiments, the raw alarm data is received wirelessly. In some embodiments, the raw alarm data is received via a wired connection. The raw alarm data includes data related to an error within a component of the network. In some embodiments, the component includes one or more of an element management system (EMS), a device, a service, or another component of the network. In some embodiments, the network is configured to generate raw alarm data in a specific format. In some embodiments, the format for alarm data generation is set during installation or initialization of the component in the network. In some embodiments, the format for the alarm data generation is set by the network monitoring system after installation of the component in the network.

In operation 104, a determination is made regarding whether the received raw alarm data is in a correct format. If the network monitoring system is unable to analyze the received raw alarm data, then the network monitoring system will discard the received raw alarm data. In some embodiments, the network monitoring system is capable of analyzing alarm data in a single format. In some embodiments, the network monitoring system is capable of analyzing alarm data in multiple formats. In some embodiments where multiple formats are capable of being analyzed, the operation 104 determines whether the received alarm data is in any one of the acceptable formats. In some embodiments, the correct format includes JavaScript Object Notation (JSON), Python, YAML, or another suitable format. The determination regarding the format of the receive alarm data is made using at least one processor of the network monitoring system. In response to a determination that the received raw alarm data is in a correct format, the method 100 proceeds to operation 106, as indicated by (Y). In response to a determination that the received raw alarm data is not in a correct format, the method 100 proceeds operation 126, as indicated by (N). In some embodiments, in response to a determination that the received raw alarm is not in the correct format, the discarded alarm is given a root cause analysis (RCA) label of "error code not found."

In operation 106, a determination is made regarding whether the alarm data includes an error code. The error code indicates a type of problem occurring in the component. In some embodiments, the error code is determined based on a format of the raw alarm data. In some embodiments, the error code is set by a vendor who operates the telecommunication network. In some embodiments, the error code is set by a monitoring company that operates the network monitoring system. If the error code is not present in the received raw alarm data, then the network monitoring system will be unable to determine a type of problem that occurred or is occurring. In some embodiments, the error code includes a numerical code. In some embodiments, the error code includes an alphanumeric code. The determination regarding whether the error code exists in the received raw alarm data is performed by a processor of the network monitoring system. In response to a determination that an error code exists in the alarm data, the method 100 proceeds to operation 110, as indicated by (Y). In response to a determination that the error code does not exist in the alarm library, the method 100 proceeds to operation 126, as indicated by (N). In some embodiments, in response to a determination that the error code does not exist, the discarded alarm is given an RCA label of "error code not found."

In operation 108, error codes are received from an alarm library. The error codes known to the network monitoring system are stored as the alarm library in a database (DB) that is accessible by the network monitoring system. In some embodiment, the alarm library is updated as new components that are capable of experience new error are included in the network. In some embodiments, the alarm library is generated by the vendor. In some embodiments, the alarm library is generated by a network monitor. In some embodiments, the error codes are received wirelessly. In some embodiments, the error codes are received via a wired connection. In some embodiments, the alarm library includes error codes for different formats, e.g., a first set of error codes for JSON format and a second set of error codes for Python format.

In operation 110, a determination is made regarding whether the error code in the received raw alarm data is present in the alarm library. If the error code is not present in the alarm library, then the network monitoring system will be unable to determine the type of problem that exists within the component. In some instances, an error code that is not included in the alarm library indicates that the component is a new component and that the error codes are not yet included in the alarm library. In some instances, an error code that is not included in the alarm library indicates that the component is faulty in generating the error code. In some instances, an error code that is not included in the alarm library indicates that the raw alarm data was corrupted prior to reception by the network monitoring system, for example by a latency issue within the network. In some embodiments, the determination regarding whether the error code is in the alarm library is determined by identifying a format of the received raw alarm data and considering only error codes associated with the determined format of the received raw alarm data. In some embodiments, the determination regarding whether the error code is in the alarm library is performed by checking all error codes regardless of format. The determination for whether an error code is present in the alarm library is made using a processor of the network monitoring system. In response to a determination that the error code exists in the alarm library, the method 100 proceeds to operation 112, as indicated by (Y). In response to a determination that the error code is not present in the alarm library, the method 100 proceeds to operation 126, as indicated by (N). In some embodiments, in response to a determination that the error code does not exist in the alarm library, the discarded alarm is given an RCA label of "error code not found."

In operation 112, a determination is made regarding whether device information is present in the received raw alarm data. If the device information is not present in the alarm data, then the network monitoring system will be unable to determine which component in the network is experiencing the problem. The determination regarding whether the device information is present is performed using a processor of the network monitoring system. In response to a determination that the device information is present in the received raw alarm data, the method 100 proceeds to operation 116, as indicated by (Y). In response to a determination that the device information is not present in the received raw alarm data, the method 100 proceeds to operation 126, as indicated by (N). In some embodiments, in response to a determination that the received raw alarm data does not include device information, the discarded alarm is given an RCA label of "network element not found."

In operation 114, an inventory of devices within the network is received from an inventory database (DB). The inventory DB is accessible by the network monitoring system. The inventory DB includes information, such as model number, serial number, location, etc., for devices in the network. In some embodiment, the inventory DB is updated as new components are included in the network. In some embodiments, the inventory DB is maintained by the vendor. In some embodiments, the inventory DB is maintained by a network monitor. In some embodiments, the inventory DB is received wirelessly. In some embodiments, the inventory DB is received via a wired connection. In some embodiments, the inventory DB includes information about devices removed from the network or devices that are not monitored. For example, in some embodiments, the inventory DB includes information related to a component that was replaced. Including information for a component that was replaced would allow the network monitoring system to determine that the received alarm data is inaccurate if device information indicated a replaced component is received. In some instances, the term device and the term component are used interchangeably; and both refer to elements within the network that are usable to provide functionality of the network.

In operation 116, a determination is made regarding whether the device information in the received raw alarm data corresponds to a device in the inventory DB. By determining whether the device information in the raw alarm data matches a device in the network, the network monitoring system is able to determine whether the alarm data is applicable to the network. The determination regarding whether the device information corresponds to a device in the inventory DB is performed using a processor in the network monitoring system. In response to a determination that the device information corresponds to a device in the inventory DB, the method 100 proceeds to operation 118, as indicated by (Y). In response to a determination that the device information does not correspond to any device in the inventory DB, the method 100 proceeds to operation 126, as indicated by (N). In some embodiments, in response to a determination that the device information does not match any device in the inventory DB, the discarded alarm is given an RCA label of "network element not found in database."

In operation 118, a determination is made regarding whether the device corresponding to the device in the inventory DB is a monitored device. If the device in the network corresponding to the device information is not a monitored device, then the network monitoring system is not responsible for issuing instructions for repairing or replacing the component. In some instances, a device is used for testing of the network, but not used during actual implementation of the network. Such a device would no longer be monitored by the network monitoring system once the network is in an implementation stage. In some instances, the device in the network corresponding to the device information is outside of a scope of work for the network monitoring system. For example, in some instances, a vendor contracts with the network monitor to provide monitoring services for less than an entirety of the network. In some embodiments, in response to determining that the device in the network corresponding to the device information is outside of the scope of work for the network monitoring system, the network monitoring system is configured to automatically notify the vendor regarding the received alarm data, either wirelessly or via a wired connection. The determination regarding whether the device information is a monitored device is performed using a processor in the network monitoring system. In response to a determination that the device in the network corresponding to the device information is a monitored device, the method 100 proceeds to operation 120, as indicated by (Y). In response to a determination that the device in the network corresponding to the device information is not a monitored device, the method 100 proceeds to operation 126, as indicated by (N). In some embodiments, in response to a determination that the device information indicates a device that is not monitored, the discarded alarm is given an RCA label of "network element not monitored."

In operation 120, a determination is made regarding whether a time of an event is included in the received raw alarm data. The event is a time at which the alarm data was generated by the component. If the time of the event is not known, then the network monitoring system will be unable to determine whether the alarm is an old alarm that has already been resolved. The determination regarding whether the time of the event is present in the received raw data is performed using a processor of the network monitoring system. In response to a determination that the time of the event is present in the received raw alarm data, the method 100 proceeds to operation 122, as indicated by (Y). In response to a determination that the time of the event is not present in the received raw alarm data, the method 100 proceeds to operation 126, as indicated by (N). In some embodiments, in response to a determination that the received raw alarm data does not include an event time, the discarded alarm is given an RCA label of "invalid event time."

In operation 122, a determination is made regarding whether the time of the event is in a correct format. The time of the event being in the correct format means that the time is in a correct time zone where the network is operating; the event time is in the future, i.e., ahead of the current time; or another suitable formatting inconsistency. If the time of the event is not in the correct format, this discrepancy indicates a lack of reliability in the time information from the received raw alarm data. The determination regarding whether the time is in the correct format is performed using a processor of the network monitoring system. In response to a determination that the time of the event is in the correct format, the method 100 proceeds to operation 124, as indicated by (Y). In response to a determination that the time of the event is in the incorrect format, the method 100 proceeds to operation 126, as indicated by (N). In some embodiments, in response to a determination that the event time is in an incorrect format, the discarded alarm is given an RCA label of "invalid event time."

In operation 124, the received raw alarm data is subjected to normal alarm processing. Normal alarm processing means that the raw alarm data is not discarded and that an alarm is generated by the network monitoring system. The alarm is assigned a priority level based on at least one of the error code, the device information, or the time of the event.

Remedial measures are taken to address the alarm based on the priority level of the alarm. In some embodiments, the remedial measures include generating instructions for a maintenance crew to repair or replace the device corresponding to the device information. In some embodiments, the remedial measures include remotely accessing the device and updating software within the device, restarting the device, or other suitable remedial measures capable of being implemented directly by the network monitoring system either wirelessly or via a wired connection. In some embodiments, the operation 124 further includes monitoring the alarm until the remedial measures are implemented and the alarm ends.

In operation 126, duplicate alarms are suppressed. The operation 126 receives all raw alarm data that fails any of the determinations of the method 100. In some instances, these alarms are called discarded alarms. Suppressing discarded alarms means that multiple discarded alarms are reduced to a single entry in the alarm log. By suppressing discarded alarms, the network monitoring system is able to reduce storage space for an alarm log. Suppressing the discarded alarms also helps to reduce an amount of information to be viewed and considered by a network monitor. Reducing the amount of information for the network monitor to consider helps to reduce a risk of the network monitor overlooking an alarm or failing to timely address an alarm. The suppressing of the discarded alarms removes repetitive alarms that have incomplete information, which helps to reduce frustration on the part of the network monitor. The suppressing of the discarded alarms is performed using a processor of the network monitoring system. The discarded alarms are suppressed by comparing available information in the received raw alarm data.

In some embodiments, discarded alarms are suppressed in response to information that is available matching and similar fields in the information being missing. For example, in some embodiments, a first alarm having a first error code; device information indicating a first device; and missing an event time would be suppressed with a second alarm having the first error code; device information indicating the first device; and missing an event time. In contrast, for example, in some embodiments, a first alarm having the first error code; missing device information; and having a first event time would not be suppressed with a second alarm having the first error code; device information indicating the first device; and missing an event time.

In some embodiments, discarded alarms are suppressed in response to all available information matching regardless of whether the missing information is at the same field of the received raw alarm data. For example, in some embodiments, a first alarm having a first error code; missing device information; and having a first event time is suppressed with a second alarm having the first error code; missing device information and having a second event time. In another example, in some embodiments, a first alarm having a first error code; device information indicating a first device; and missing event time is suppressed with a second alarm missing error code information; having device information indicating the first device; and having the first event time. In contrast, for example, in some embodiments, a first alarm having the first error code; device information indicating the first device; and missing an event time is not suppressed with a second alarm having the first error code; device information indicating a second device; and missing an event time.

One of ordinary skill in the art would understand that the above examples for suppressing of the discarded alarms are merely exemplary and are not intended to limit the suppression to only the above examples.

In some embodiments, the operation 126 further includes a root cause analysis (RCA) for why the alarm was discarded. The RCA indicates a reason that the network monitoring system was unable to process the received alarm data normally, e.g., using operation 124. In some embodiments, the RCA is listed along with the discarded alarm in a report, e.g., generated in operation 130. In some embodiments, suppressing of discarded alarms is prevented if the RCA is different. For example, in some embodiments, a first alarm having an RCA of "network element not found" is not suppressed with a second alarm having an RCA of "invalid time event." One of ordinary skill in the art would understand that RCA other than those mentioned above are within the scope of this description. Further, in some embodiments, customizable RCA are usable in the network monitoring system.

In operation 128, the discarded alarms are stored. In some embodiments, the discarded alarms are stored in a local memory of the network monitoring system. In some embodiments, the discarded alarms are stored in a separate memory, such as a server, accessible by the network monitoring system. In some embodiments, any new discarded alarm following the operation 126 is stored as part of operation 128. In some embodiments, in response to a new discarded alarm being received that matches a previously identified discarded alarm, the new discarded alarm is not stored. In some embodiments, in response to a new discarded alarm being received that matches a previously identified discarded alarm, a priority level of the previous discarded alarm is increased.

Figure 3:
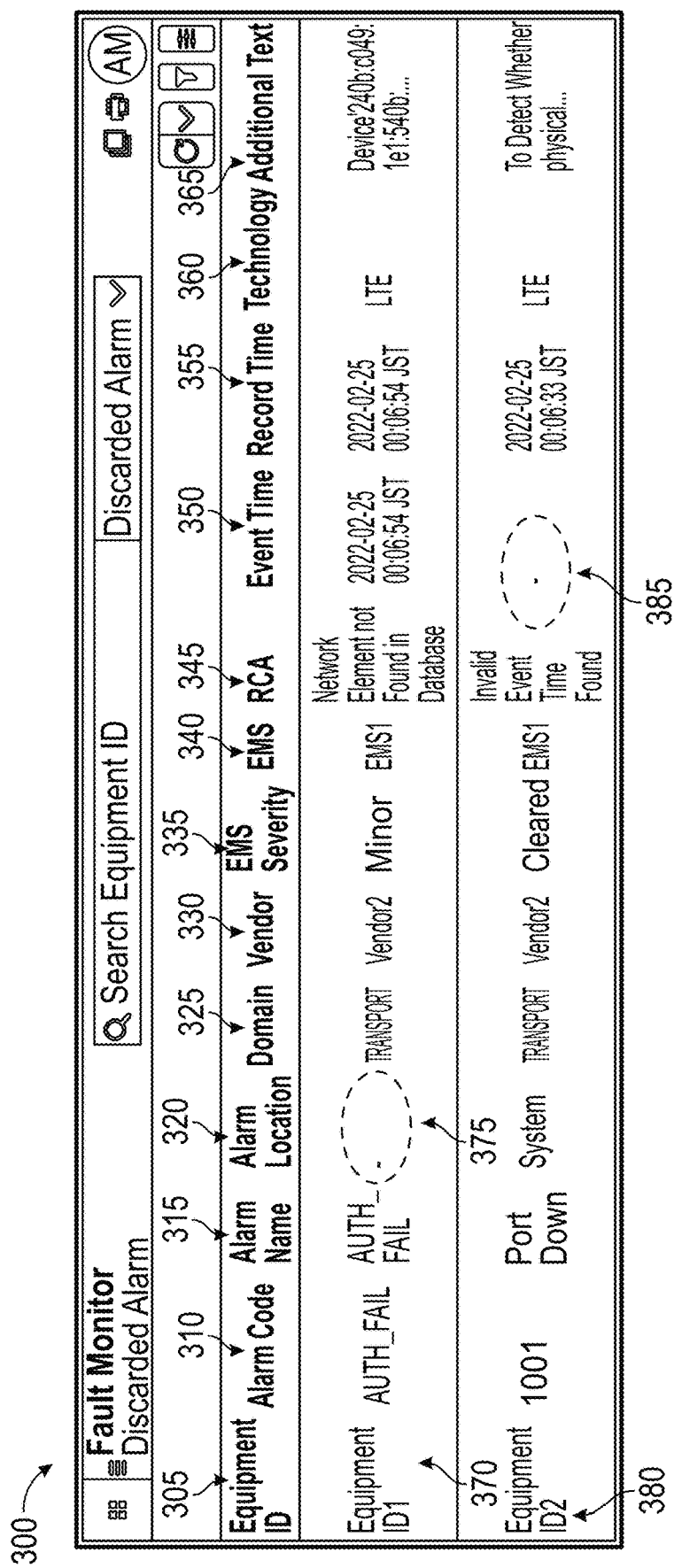
FIG. 3 is a view of a graphical user interface (GUI) including discarded alarms in accordance with some embodiments.
Figure 4:
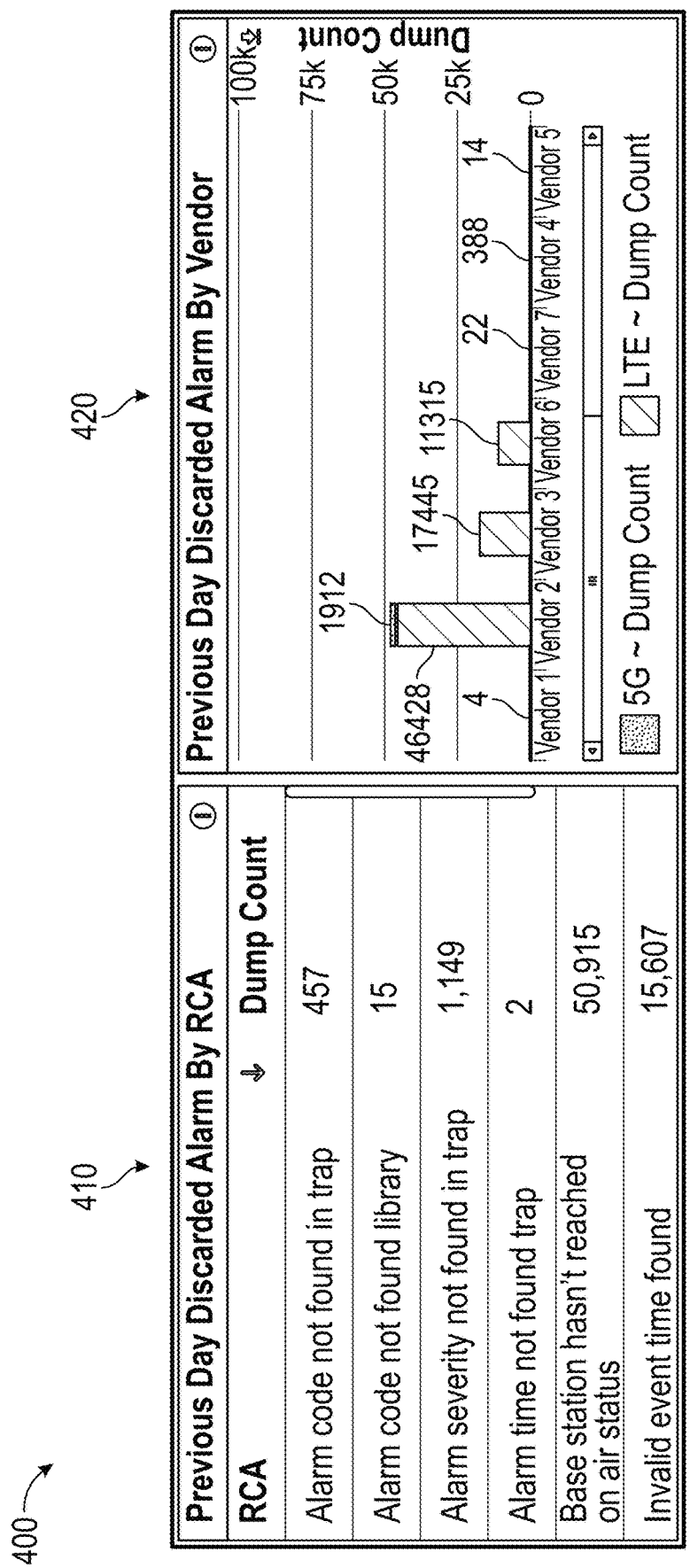
FIG. 4 is a view of a discarded alarm report in accordance with some embodiments.
Figure 5:
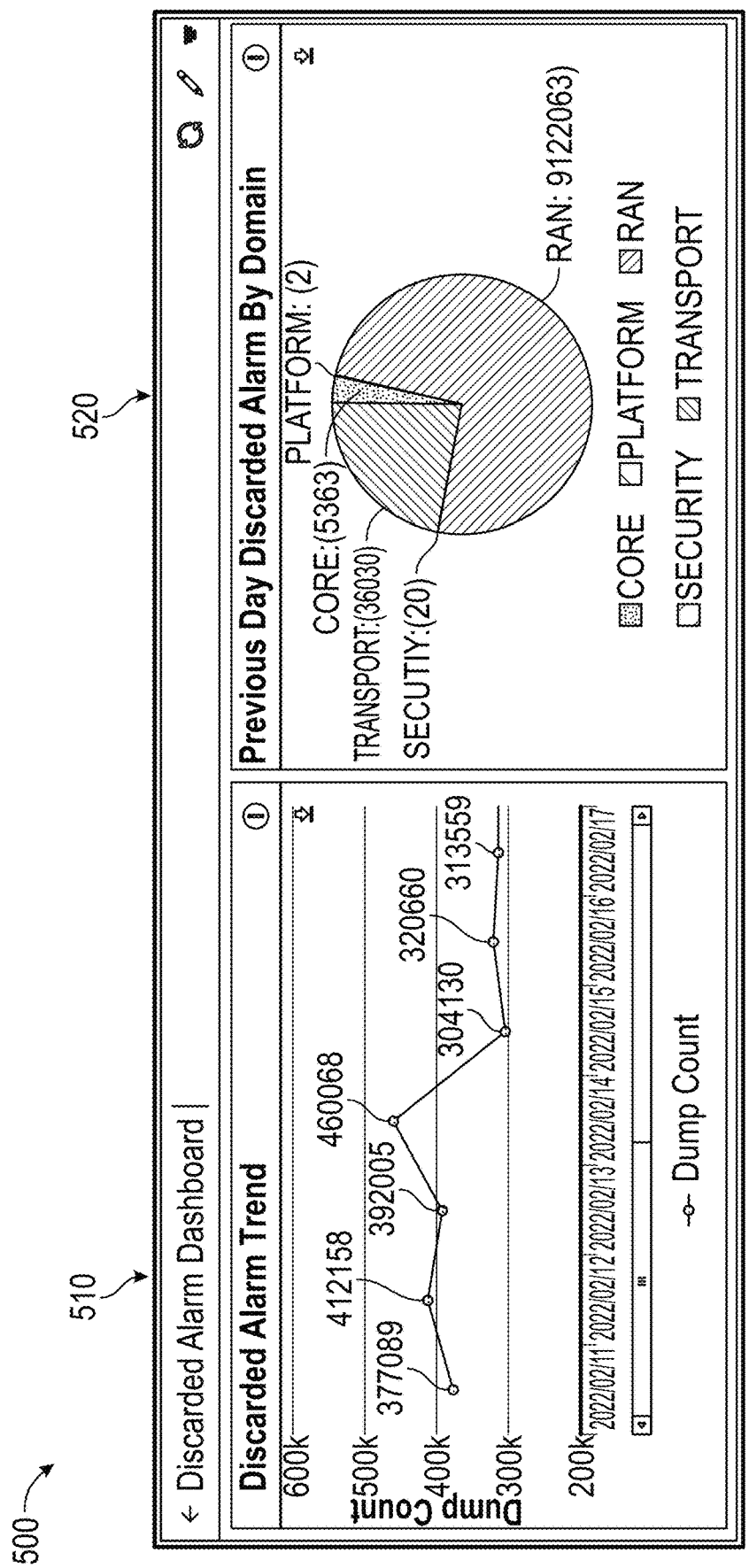
FIG. 5 is a view of a discarded alarm report in accordance with some embodiments.

In operation 130, a report for discard alarms is generated. In some embodiments, the report includes a tabular format. In some embodiments, the report includes graphical representation. In some embodiments, the report includes a combination of a tabular format and graphical representation. In some embodiments, the report includes multiple graphical representations. The report is generated using a processor of the network monitoring system. Examples of the report are provided in FIGS. 3-5. One of ordinary skill in the art would understand that FIGS. 3-5 are merely exemplary and are not intended limit the scope of this description. In some embodiments, the operation 130 causes the network monitoring system to automatically generate one or more reports. In some embodiments, the automatic generation of the reports is performed periodically. In some embodiments, the automatic generation of the reports is performed based on a trigger event set by the network monitor or the vendor. In some embodiments, the trigger event includes receipt of a certain number of discarded alarms, a change in status of multiple components in the network, or other suitable trigger events.

One of ordinary skill in the art would recognize that modifications to the method 100 are within the scope of this description. For example, the method 100 includes an analysis of the fields of error code, device information, and event time. One of ordinary skill in the art would recognize that other fields of the alarm data are also subject to analysis. In some embodiments, the method 100 includes receiving criteria for analysis from the network monitor to facilitate customization of a process of determining whether to discard an alarm. For example, in some embodiments, the method 100 further includes an additional criterion for a geographic location of the device; domain of the alarm; or other suitable criteria for determining whether to discard an alarm.

In some embodiments, additional operations are included in the method 100. For example, in some embodiments, the method 100 further includes a determination regarding a vendor specified criteria for discarding an alarm. In some embodiments, at least one operation of the method 100 is omitted. For example, in some embodiments, the operation 118 is omitted. In some embodiments, an order of operations of the method 100 is changed. For example, in some embodiments, the operation 112 is performed prior to the operation 110. One of ordinary skill in the art would recognize that additional modifications to the method 100 are within the scope of this description.

FIG. 2 is a diagram of discarded alarm information 200 in accordance with some embodiments. The discarded alarm information 200 is usable in the method 100 (FIG. 1). The discarded alarm information 200 is an example of received raw alarm data, e.g., received in operation 102 (FIG. 1). The discarded alarm information 200 is presented in a JSON format. The discarded alarm information 200 includes missing error code information 210. If the discarded alarm information 200 were received as part of operation 102 (FIG. 1) of the method 100, the discarded alarm information 200 would satisfy the condition for operation 104, but fail the condition for operation 106 and be directed to operation 126.

FIG. 3 is a view of a graphical user interface (GUI) 300 including discarded alarms in accordance with some embodiments. In some embodiments, the GUI 300 is generated by operation 130 of the method 100 (FIG. 1). In some embodiments, the GUI 300 is generated by a method other than method 100 (FIG. 1). The GUI 300 includes a tabular view of discarded alarms. For the sake of simplicity, the table in GUI 300 includes only two entries. One of ordinary skill in the art would understand that more or less than two entries are within the scope of this description.

The GUI 300 includes a plurality of columns 305-365. Each of the columns 305-365 indicate information that is able to be extracted from raw alarm data, e.g., raw alarm data received in operation 102 (FIG. 1). A first column 305 includes equipment identification (ID) and is usable to identify a device where the problem occurred. A second column 310 includes an alarm code. The alarm code is also referred to as an error code in some instances. A third column 315 includes a name of the alarm. The name of the alarm is a descriptive title associated with the alarm code to allow a network monitor to determine the problem in the device more easily. A fourth column 320 includes an alarm location. The alarm location is a location of the device. In some embodiments, the location is provided as a geographic location. In some embodiments, the location is provided as an identification of a base station where the device is located. A fifth column 325 includes a domain of the device. In some embodiments, the domain includes information such as core, radio access network (RAN), transport, etc. A sixth column 330 includes vendor information. The vendor is the entity responsible for operating the network. A seventh column 335 includes information on a criticality of the alarm. In some embodiments, the criticality is provided based on alphanumeric information. In some embodiments, the criticality is provided based on color or icon information. An eighth column 340 includes information on an element management system (EMS) of the device. In some embodiments, the EMS information relates to which EMS within the network is assigned to manage the device generating the alarm. A ninth column 345 includes information related to the RCA for the discarding of the alarm. In some embodiments, the RCA information is selected based on which operation in the method 100 (FIG. 1) the receive raw alarm data failed to satisfy. In some embodiments, the RCA information is determined by the network monitor. In some embodiments, the RCA information is determined based on which columns in the GUI 300 lack information for a specific entry. A tenth column 350 includes an event time. The event time is a time at which the alarm was initiated. In some embodiments where multiple discarded alarms are suppressed into a single entry in the GUI 300, the event time indicates an earliest time from all of the suppressed alarms. In some embodiments where multiple discarded alarms are suppressed into a single entry in the GUI 300, the even time indicates a most recent time from all of the suppressed alarms. An eleventh column 355 indicates a record time. The record time is a time at which the discarded alarm was added to the GUI 300. A twelfth column 360 indicates a technology of the device. In some embodiments, the technology of the device includes at least one of third generation (3G), fourth generation (4G), long term evolution (LTE), fifth generation (5G), or another suitable technology label. A thirteenth column 365 includes additional comments. In some embodiments, the additional comments are entered by a network monitor. In some embodiments, the additional comments are extracted from the raw alarm data based on customization in the discarded alarm process instituted by the vendor or by a network monitor. One of ordinary skill in the art would recognize that the columns described with respect to GUI 300 are merely exemplary. One of ordinary skill in the art would recognize that different columns, additional columns, or fewer columns are within the scope of this description.

The GUI 300 includes a first entry 370. The first entry 370 includes a missing field 375 indicating that some information was missing from the raw alarm data. The missing field 375 is in the alarm location column 320, indicating that location information was missing from the raw alarm data. The lack of location information resulted in an RCA of "network element not found in database" in the RCA column 345 of the first entry 370.

The GUI 300 further includes a second entry 380. The second entry 380 includes a missing field 385 in the event time column 350. The missing field 380 indicates that no even time was included in the raw alarm data. The lack of the event time information resulted in an RCA of "invalid event time found" in the RCA column 345 of the second entry 380. One of ordinary skill in the art would recognize that the first entry 370 and the second entry 380 are merely exemplary and are not intended to limit the scope of this description.

FIG. 4 is a view of a discarded alarm report 400 in accordance with some embodiments. In some embodiments, the discarded alarm report 400 is generated by operation 130 of the method 100 (FIG. 1). In some embodiments, the discarded alarm report 400 is generated by a method other than method 100 (FIG. 1). The discarded alarm report 400 includes a tabular section 410 and a graphical section 420. The tabular section 410 includes information related to RCA information for causes for raw alarm data producing discarded alarms. Using the information in the tabular section 410, a network monitor is able to determine whether a particular problem is more prevalent in the reporting of the raw alarm data. For example, in the discarded alarm report 400, the most common RCA for discarding an alarm is that a base station has not reached on air status. One of ordinary skill in the art would understand that on air status means that the base station is operational within the network. In some instances, during installation or testing of a base station, the base station is not in on air status. The high number alarms discarded for the RCA of the base station not reaching on air status indicates that a significant portion of the network is currently undergoing testing or installation in some embodiments.

The graphical section 420 includes information related to how many alarms were discarded in a previous day for a variety of vendors. In some embodiments, the network monitoring system, e.g., the network monitoring system implementing the method 100 (FIG. 1), the system 600 (FIG. 6), or another network monitoring system, monitors networks for multiple vendors. The information in the graphical section 420 includes both a total number of discarded, or "dumped," alarms as well as a technology of the discarded alarms, e.g., 5G or LTE. The graphical section 420 indicates that vendor 2 experienced the highest volume of discarded alarms in the previous day, while vendor 1 experiences the lowest volume of discarded alarms. The high number of discarded alarms for vendor 2 indicates a network that is likely undergoing significant installation or testing, in some instances. The low number of discarded alarms for vendor 1 indicates a network that is fully installed and is operating effectively, in some instances. In general, a lower number of discarded alarms indicates a healthy network that is operating properly. One of ordinary skill in the art would understand that the information provided in the discarded alarm report 400 is merely exemplary and that modifications, such as, duration of the report and style of presentation are within the scope of this description.

FIG. 5 is a view of a discarded alarm report 500 in accordance with some embodiments. In some embodiments, the discarded alarm report 500 is generated by operation 130 of the method 100 (FIG. 1). In some embodiments, the discarded alarm report 500 is generated by a method other than method 100 (FIG. 1). The discarded alarm report 500 includes a first graphical section 510 including a line graph of a number of discarded alarms per day over several days. The discarded alarm report 500 further includes a second graphical section 520 including a pie chart of different domains of discarded alarms from a previous day.

The first graphical section 510 includes a number of discarded alarms on each day over a number of days. In some embodiments, a number of days is adjustable based on input from the network monitor. The line graph in the first graphical section 510 indicates a noticeable decrease in discarded alarms between Feb. 14, 2022, and Feb. 15, 2022. In some instances, such a decrease in the number of discarded alarms indicates that devices of the network transition from a testing phase to an operational, or on air, phase.

The second graphical section 520 includes a pie chart showing a number of domains of discarded alarms within a single day. The pie chart also helps to visualize proportions of the discarded alarms for each domain. As with the first graphical section 510, a time period over which the second graphical section 520 displays information is adjustable based on a report desired by the network monitor.

The discarded alarm report 400 (FIG. 4) and the discarded alarm report 500 (FIG. 5) are merely examples. One of ordinary skill in the art would recognize that additional reports based on information generated during the method 100 (FIG. 1); or displayed in the GUI 300 (FIG. 3) are within the scope of this description. Different types of graphs or tables are also within the scope of this description.

FIG. 6 is a schematic diagram of a system 600 for collecting discarded alarms in accordance with some embodiments. In some embodiments, the system 600 is usable as a network monitoring system as described above, for example, with respect to the method 100 (FIG. 1). System 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with external devices for receiving alarm data, alarm library, inventory database, etc. The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause system 600 to be usable for performing a portion or all of the operations as described in method 100 (FIG. 1) or generate GUI 300 (FIG. 3), discarded alarm report 400 (FIG. 4), or discarded alarm report 500 (FIG. 5).

In some embodiments, the processor 602 is a central processing unit (CPU), a multi-processor, a distributed processing system, an application specific integrated circuit (ASIC), and/or a suitable processing unit.

In some embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD).

In some embodiments, the storage medium 604 stores the computer program code 606 configured to cause system 600 to perform a portion or all of the operations as described in method 100 (FIG. 1) or generate GUI 300 (FIG. 3), discarded alarm report 400 (FIG. 4), or discarded alarm report 500 (FIG. 5). In some embodiments, the storage medium 604 also stores information needed for performing a portion or all of the operations as described in method 100 (FIG. 1) or generate GUI 300 (FIG. 3), discarded alarm report 400 (FIG. 4), or discarded alarm report 500 (FIG. 5) as well as information generated during performing a portion or all of the operations as described in method 100 (FIG. 1) or generate GUI 300 (FIG. 3), discarded alarm report 400 (FIG. 4), or discarded alarm report 500 (FIG. 5), such as an alarm library parameter 616, an inventor database parameter 618, a discarded alarms parameter 620, a reports parameter 622, and/or a set of executable instructions to perform a portion or all of the operations as described in method 100 (FIG. 1) or generate GUI 300 (FIG. 3), discarded alarm report 400 (FIG. 4), or discarded alarm report 500 (FIG. 5).

In some embodiments, the storage medium 604 stores instructions 607 for interfacing with manufacturing machines. The instructions 607 enable processor 602 to generate manufacturing instructions readable by the manufacturing machines to effectively implement method 400 during a manufacturing process.

System 600 includes I/O interface 610. I/O interface 610 is coupled to external circuitry. In some embodiments, I/O interface 610 includes a keyboard, keypad, mouse, trackball, trackpad, and/or cursor direction keys for communicating information and commands to processor 602.

System 600 also includes network interface 612 coupled to the processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in method 100 (FIG. 1) or generate GUI 300 (FIG. 3), discarded alarm report 400 (FIG. 4), or discarded alarm report 500 (FIG. 5) is implemented in two or more systems 600, and information such as alarm library, inventory database, discarded alarms, or reports are exchanged between different systems 600 via network 614.

An aspect of this description relates to a system for collecting discarded alarm. The system includes a non-transitory computer readable medium configured to store instructions thereon. The system further includes a processor connected to the non-transitory computer readable medium. The processor is configured to execute the instructions for receiving alarm data from a device within a telecommunication network. The processor is further configured to execute the instructions for determining whether the alarm data is missing identifying information. The processor is further configured to execute the instructions for subjecting the alarm data to suppression in response to a determination that the alarm data is missing at least one piece of identifying information. The processor is further configured to execute the instructions for generating instructions for addressing an alarm in response to a determination that the alarm data includes all identifying information. In some embodiments, the processor is further configured to execute the instructions for determining whether the alarm data is missing identifying information based on whether the alarm data is missing at least one of an error code, device information or an event time. In some embodiments, the processor is further configured to execute the instructions for generating a report including the suppressed alarm data. In some embodiments, the processor is further configured to execute the instructions for generating the report including at least one of a tabular representation or a graphical representation. In some embodiments, the processor is further configured to execute the instructions for suppressing the alarm data based on a comparison with previously discarded alarm data. In some embodiments, the processor is further configured to execute the instructions for suppressing the alarm data by reducing the alarm data and the previously discarded alarm data into a single discarded alarm in response to available identifying information in the alarm data matching available identifying information in the previously discarded alarm data. In some embodiments, the processor is further configured to execute the instructions for suppressing the alarm data by creating a first entry for the alarm data and a second entry for the previously discarded alarm data in response to available identifying information in the alarm data failing to match available identifying information in the previously discarded alarm data. In some embodiments, the processor is further configured to execute the instructions for determining a root cause analysis (RCA) for the alarm data in response to determining that the alarm data is missing the at least one piece of identifying information. In some embodiments, the processor is further configured to execute the instructions for determining whether the identifying information in the alarm data fails to match at least one of an alarm library or an inventory database; and subjecting the alarm data to the suppression in response to a determination that the identifying information fails to match at least one of the alarm library or the inventory database.

An aspect of this description relates to a method of collecting discarded alarm. The method includes receiving alarm data from a device within a telecommunication network. The method further includes determining whether the alarm data is missing identifying information. The method further includes subjecting the alarm data to suppression in response to a determination that the alarm data is missing at least one piece of identifying information. The method further includes generating instructions for addressing an alarm in response to a determination that the alarm data includes all identifying information. In some embodiments, determining whether the alarm data is missing identifying information includes determining whether the alarm data is missing the identifying information based on whether the alarm data is missing at least one of an error code, device information or an event time. In some embodiments, the method further includes generating a report including the suppressed alarm data. In some embodiments, generating the report includes generating the report comprising at least one of a tabular representation or a graphical representation. In some embodiments, suppressing the alarm data includes suppressing the alarm data based on a comparison with previously discarded alarm data. In some embodiments, suppressing the alarm data includes reducing the alarm data and the previously discarded alarm data into a single discarded alarm in response to available identifying information in the alarm data matching available identifying information in the previously discarded alarm data. In some embodiments, suppressing the alarm data includes creating a first entry for the alarm data and a second entry for the previously discarded alarm data in response to available identifying information in the alarm data failing to match available identifying information in the previously discarded alarm data. In some embodiments, the method further includes determining a root cause analysis (RCA) for the alarm data in response to determining that the alarm data is missing the at least one piece of identifying information. In some embodiments, the method further includes determining whether the identifying information in the alarm data fails to match at least one of an alarm library or an inventory database; and subjecting the alarm data to the suppression in response to a determination that the identifying information fails to match at least one of the alarm library or the inventory database.

An aspect of this description relates to a non-transitory computer readable medium configured to store instructions thereon. The instructions are configured to cause a processor executing the instructions to receive alarm data from a device within a telecommunication network. The instructions are configured to cause a processor executing the instructions to determine whether the alarm data is missing identifying information. The instructions are configured to cause a processor executing the instructions to subject the alarm data to suppression in response to a determination that the alarm data is missing at least one piece of identifying information. The instructions are configured to cause a processor executing the instructions to generate instructions for addressing an alarm in response to a determination that the alarm data includes all identifying information. In some embodiments, the instructions are further configured to cause the processor executing the instructions to determine whether the identifying information in the alarm data fails to match at least one of an alarm library or an inventory database; and subject the alarm data to the suppression in response to a determination that the identifying information fails to match at least one of the alarm library or the inventory database.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for collecting discarded alarm, the system comprising:
    a non-transitory computer readable medium configured to store instructions thereon; and
    a processor connected to the non-transitory computer readable medium, wherein the processor is configured to execute the instructions for:
        receiving alarm data from a device within a telecommunication network;
        determining whether the alarm data is missing identifying information;
        subjecting the alarm data to suppression in response to a determination that the alarm data is missing at least one piece of identifying information; and
        generating instructions for addressing an alarm in response to a determination that the alarm data includes all identifying information.

2. The system according to claim 1, wherein the processor is further configured to execute the instructions for:
    determining whether the alarm data is missing identifying information based on whether the alarm data is missing at least one of an error code, device information or an event time.

3. The system according to claim 1, wherein the processor is further configured to execute the instructions for:
    generating a report including the suppressed alarm data.

4. The system according to claim 3, wherein the processor is further configured to execute the instructions for:
    generating the report including at least one of a tabular representation or a graphical representation.

5. The system according to claim 1, wherein the processor is further configured to execute the instructions for:
    suppressing the alarm data based on a comparison with previously discarded alarm data.

6. The system according to claim 5, wherein the processor is further configured to execute the instructions for:
    suppressing the alarm data by reducing the alarm data and the previously discarded alarm data into a single discarded alarm in response to available identifying information in the alarm data matching available identifying information in the previously discarded alarm data.

7. The system according to claim 5, wherein the processor is further configured to execute the instructions for:
    suppressing the alarm data by creating a first entry for the alarm data and a second entry for the previously discarded alarm data in response to available identifying information in the alarm data failing to match available identifying information in the previously discarded alarm data.

8. The system according to claim 1, wherein the processor is further configured to execute the instructions for:
    determining a root cause analysis (RCA) for the alarm data in response to determining that the alarm data is missing the at least one piece of identifying information.

9. The system according to claim 1, wherein the processor is further configured to execute the instructions for:
    determining whether the identifying information in the alarm data fails to match at least one of an alarm library or an inventory database; and
    subjecting the alarm data to the suppression in response to a determination that the identifying information fails to match at least one of the alarm library or the inventory database.

10. A method of collecting discarded alarm, the method comprising:
    receiving alarm data from a device within a telecommunication network;
    determining whether the alarm data is missing identifying information;
    subjecting the alarm data to suppression in response to a determination that the alarm data is missing at least one piece of identifying information; and
    generating instructions for addressing an alarm in response to a determination that the alarm data includes all identifying information.

11. The method according to claim 10, wherein determining whether the alarm data is missing identifying information comprises determining whether the alarm data is missing the identifying information based on whether the alarm data is missing at least one of an error code, device information or an event time.

12. The method according to claim 10, further comprising generating a report including the suppressed alarm data.

13. The method according to claim 12, wherein generating the report comprises generating the report comprising at least one of a tabular representation or a graphical representation.

14. The method according to claim 10, wherein suppressing the alarm data comprises suppressing the alarm data based on a comparison with previously discarded alarm data.

15. The method according to claim 14, wherein suppressing the alarm data comprises reducing the alarm data and the previously discarded alarm data into a single discarded alarm in response to available identifying information in the alarm data matching available identifying information in the previously discarded alarm data.

16. The method according to claim 14, wherein suppressing the alarm data comprises creating a first entry for the alarm data and a second entry for the previously discarded alarm data in response to available identifying information in the alarm data failing to match available identifying information in the previously discarded alarm data.

17. The method according to claim 10, further comprising determining a root cause analysis (RCA) for the alarm data in response to determining that the alarm data is missing the at least one piece of identifying information.

18. The method according to claim 10, further comprising:
    determining whether the identifying information in the alarm data fails to match at least one of an alarm library or an inventory database; and subjecting the alarm data to the suppression in response to a determination that the identifying information fails to match at least one of the alarm library or the inventory database.

19. A non-transitory computer readable medium configured to store instructions thereon, wherein the instructions are configured to cause a processor executing the instructions to:
- receive alarm data from a device within a telecommunication network;
- determine whether the alarm data is missing identifying information;
- subject the alarm data to suppression in response to a determination that the alarm data is missing at least one piece of identifying information; and
- generate instructions for addressing an alarm in response to a determination that the alarm data includes all identifying information.

20. The non-transitory computer readable medium according to claim 19, wherein the instructions are further configured to cause the processor executing the instructions to:
- determine whether the identifying information in the alarm data fails to match at least one of an alarm library or an inventory database; and
- subject the alarm data to the suppression in response to a determination that the identifying information fails to match at least one of the alarm library or the inventory database.

* * * * *